Jan. 30, 1968  F. W. CUNNINGHAM  3,365,798
DEVICE FOR CUTTING SOFT WRAPPINGS
Filed April 8, 1966
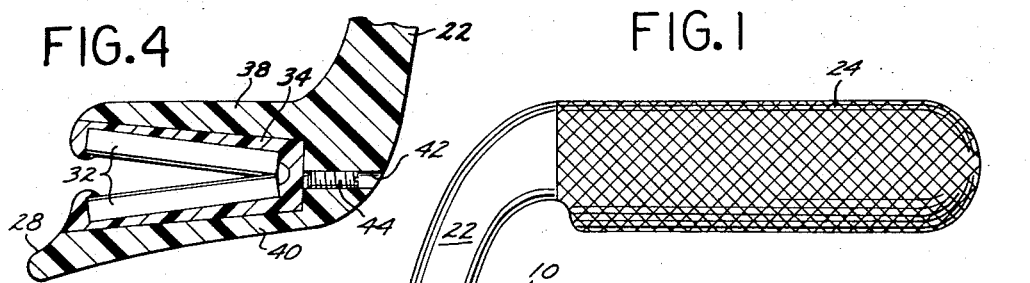
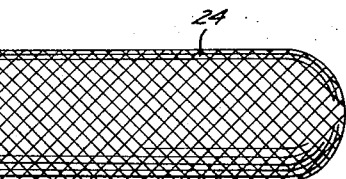
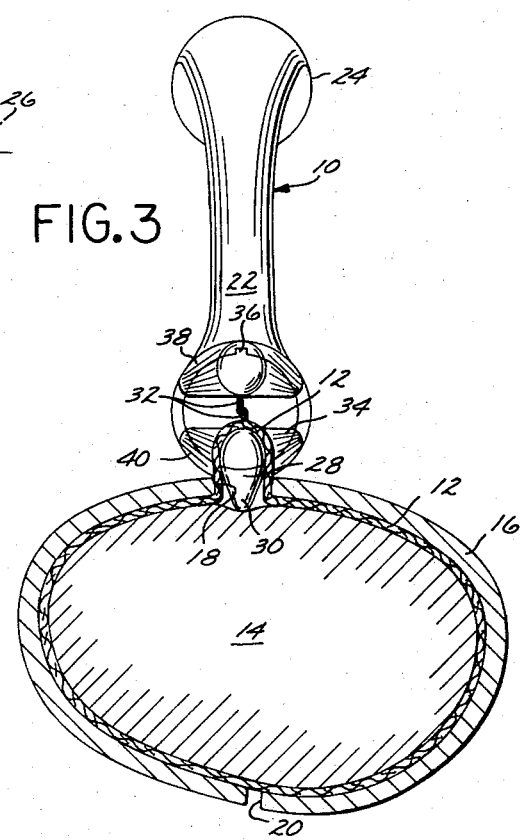
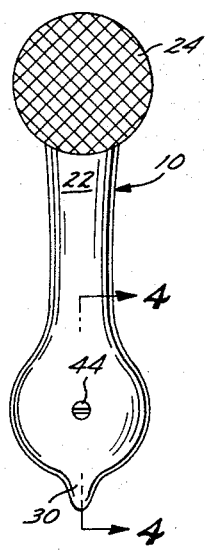
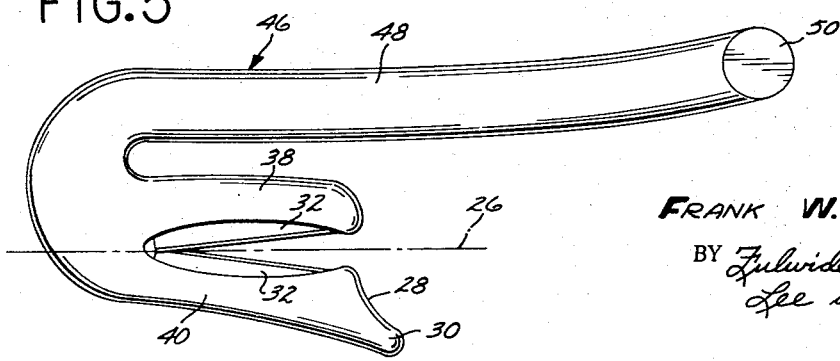
INVENTOR.
FRANK W. CUNNINGHAM
BY Fulwider, Patton, Rieber,
Lee and Utecht
ATTORNEYS 3,365,798
DEVICE FOR CUTTING SOFT WRAPPINGS
Frank W. Cunningham, 23151 Doris Way,
Torrance, Calif. 90505
Filed Apr. 8, 1966, Ser. No. 541,287
2 Claims. (Cl. 30—287)

ABSTRACT OF THE DISCLOSURE

A device for cutting soft wrappings underlying a slot cut in a plaster cast, the device including a guide shoe for extension through the slot for engagement with the wrappings to force them outwardly of the slot and between a pair of resilient cutting blades arranged to intersect at their rearward termini so that the blades can spring apart slightly and free any uncut fibers and thereby prevent periodic fiber build-up and jamming of the device.

---

The present invention relates to a device for cutting soft wrappings, and more particularly to a device for cutting the soft wrappings underlying a plaster cast through a slot formed in the cast.

Plaster casts encasing portions of the human body, and particularly the extremities, are initially structurally weakened to facilitate removal. This is usually done by forming two longitudinal cuts or slots in the cast with an electrically operated rotary saw. Thereafter the soft wrapping next to the skin and underlying the cast must be cut to allow the cast to be removed. The wrappings are adherent to the plaster and can conveniently be cut only through the saw slot.

Heavy shears are now in common use to cut the wrappings through the slot in the cast. However, the procedure is slow and laborious and great care must be taken to properly fit the shears through the relatively small slot, while avoiding injury to the skin of the patient. An alternative method for cutting the wrappings entails the use of a power cutter having a circular blade which is covered by a shield except for a small cutting area. The power cutter is regarded as dangerous since it sometimes tends to pull the patient's skin into the cutting blade.

Accordingly, it is an object of the present invention to provide a device for cutting the soft wrappings underlying a plaster cast, through a slot formed in the cast by a saw or the like, without injury to the patient and without appreciable effort.

It is another object of the invention to provide a device of the aforementioned character employing a pair of cutting elements having their cutting edges oriented in confronting, intersecting relation to cut the soft wrappings as the device is advanced along the slot of the cast, without binding and bunching of the wrappings between the edges.

A further object of the invention is to provide a device of the aforementioned character in which the cutting elements are readily replaceable when they become worn and dull. A related object is to encase the cutting elements in a replaceable cartridge to thereby insure that the cutting edges are always properly oriented for the most efficient cutting action.

Yet another object of the invention is to provide a device of the aforementioned character in which the main portion of the device rides along the outside of the cast and a smaller depending portion constituting a guide shoe extends through the slot in the cast and is operative to urge a portion of the wrappings out of the slot and between the cutting elements for severance.

Another object of the invention is the provision of a device of the aforementioned character which is inexpensive to manufacture, easily fitted with cutting elements, compact, and characterized by long service life.

Other objects and features of the invention will become apparent from consideration of the following description taken in connection with the accompanying drawings, in which:

FIG. 1 is a side elevational view of a cutting device according to the present invention and constituting an embodiment which is pushed to effect a cutting action;

FIG. 2 is a rear elevational view of the device of FIG. 1;

FIG. 3 is a front elevational view of the device of FIG. 1 shown in use in connection with a typical plaster cast;

FIG. 4 is a partial view taken along the line 4—4 of FIG. 2; and

FIG. 5 is a side elevational view of another embodiment of the present invention, and which is pulled to effect a cutting action.

Referring now to the drawings, and particularly FIGS. 1 through 4 thereof, there is illustrated a cutting device 10 according to the present invention and adapted to cut the soft underwrappings or bandages 12 wound about a human extremity 14 and underlying a plaster cast 16 in which a slot 18 and a slot 20 have been formed by a power operated rotary saw or the like.

The device 10 includes an elongated body portion or member 22 having at one extremity an elongated grip or handle 24 extending generally parallel to the axis of advancement of the device 10 along the slot 18. This axis is generally indicated by the numeral 26 in FIG. 1. At the opposite extremity the member 22 includes a downwardly and forwardly inclined surface 28 which terminates in a smoothly rounded guide shoe 30 which is sufficiently narrow to extend through the slot 18, the usual slot provided by conventional saws for this purpose being approximately ⅜ to ¾ inch wide. The slots 18 and 20 permit the cast to be spread somewhat, thereby enlarging the slot 18 for receipt of the shoe 30, although, as previously indicated the bandages 12 must be cut to permit the halves to be separated from the extremity 14.

The rounded and inclined character of the guide shoe 30 adapts it to more in advance of the rest of the device 10 as the device is pushed along the slot 18 by the handle 24. Extension of the shoe 30 through the slot 18 guides the device 10 longitudinally of the slot during such advancement by the handle 24. In addition the shoe 30 is adapted to engage and slip beneath the edge of the bandages 12, travel beneath the bandages, and raise the bandages along the inclined surface 28 and outwardly of the slot 18, as best viewed in FIG. 3.

The inclined surface 28 extends upwardly and rearwardly toward the confronting, rearwardly convergent cutting edges of a pair of cutting elements or blades 32. The blades 32 can be ordinary, characteristically resilient single edge "injector" razor blades and preferably are embedded in an elongated cartridge 34 made of thermoplastic material or the like and characterized by a cylindrical exterior surface having an axially extending ridge or key 36 on its upper periphery. The blades 32 are molded into the cartridge 34 in any suitable manner so that the straight cutting edges thereof are spaced apart at the forward end of the cartridge 34, and converge rearwardly until they intersect at the rearward end of the cartridge. The tips of the trailing extremities of the cutting edges of the blades 32 overlap at the point of intersection, as best viewed in FIG. 3 and in FIGS. 1, 4 and 5.

The acute angle between the blade cutting edges is preferably rather shallow. An angle of between 5 degrees and 10 degrees has operated satisfactorily to cleanly sever or cut the bandages 12 as they ride up the inclined surface 28 and between the blades during advancement of the device 10 along the slot 18.

The cylindrical cartridge 34 and the rigidly mounted blades 32 are press-fitted into a horizontally oriented complemental cylindrical opening provided in the lower extremity of the member 22. The opening includes a slot which slidably receives the key 36 of the cartridge 34 to prevent the cartridge from rotating relative to the member 22.

The cutting opening or aperture for the cartridge extends laterally beyond the cartridge to define vertically spaced jaws 38 and 40, the elongated side apertures on either side of the jaws 38 and 40 permitting the bandages 12 to move freely into the cutting rear portions of the blades 32 during advancement of the device 10 along the slot 18 of the casting. As seen in FIGS. 1, 4 and 5, the point of intersection and rearward termini of the cutting edges of the blades are located ahead of and in spaced relation to the trailing end of the cutting aperture between the jaws 38 and 40 to define a relief space into which any uncut fibers can pass to clear the blades. The minute amount of uncut fibers are then simply torn apart upon further advance of the device 10.

The cartridge 34 and its complemental opening in the member 22 could of course be formed in configurations other than a cylindrical configuration, as will be apparent. The cartridge 34 is useful primarily to afford a means for quickly replacing worn blades, but it is almost equally important for rigidly holding the blades in predetermined positions of maximum cutting efficiency, and particularly the indicated location of blade intersection.

A threaded bore 42 is provided in the lower extremity of the member 22, one end thereof opening to the exterior of the member and the other end extending into communication with the cylindrical opening which receives the cartridge 34. An ejector pin 44 is threaded into the bore 42 and is adapted to be screwed inwardly into engagement with the base of the cartridge 34 to forcibly urge the cartridge out of its complemental opening to thereby facilitate cartridge and blade replacement when needed.

Referring now to FIG. 5, there is illustrated another cutting device 46 according to the present invention. The device 46 includes an elongated body portion or member 48 which has a reversely formed lower extremity identical to the lower extremity of the previously described device 10.

The lower extremity includes the upper and lower jaws 38 and 40, and the horizontally oriented opening (not shown) receiving the replaceable cartridge 34 (not shown) which mounts the pair of blades 32.

However, in the device 10 the handle 24 thereof extended away from the direction of advancement of the guide shoe 30, that is, in a direction opposite that of the shoe 30, so that the device 10 could be pushed along the slot 18. In the device 46 the member 48 is reversely formed so that a handle 50 at the upper extremity thereof extends toward the direction of advancement of the guide shoe 30 for pulling the device 46 along the slot 18. To facilitate such a pulling action, the handle 50 is transversely oriented to define a T-configuration with the adjacent extremity of the member 48. In all respects other than the pulling action versus the pushing action, the device 46 operates like the device 10.

To cut the bandages 12 beneath the cast 16, the rounded lower portion of the guide shoe 30 is inserted through the slot 18 and beneath the bandages. Then, according to whether the device 10 or device 46 is used, the device is pushed or pulled along the slot 18. The bandages 12 are then constrained to ride up the inclined surface 28, outwardly of the slot 18, and between the blades 32, where the bandages are severed.

The guide shoe 30 protects the patient's skin from injury, tensions the bandages 12 for efficient cutting by the blades 32, and insures alignment of the cutting device with the slot 18. Accordingly, the bandages are rapidly and efficiently cut, thereby enabling the cast to be removed from the extremity 14.

Various modifications and changes may be made with regard to the foregoing detailed description without departing from the spirit of the invention or the scope of the following claims.

I claim:

1. A device for cutting the soft wrappings underlying a plaster cast through a slot formed in said cast, said device comprising:

a member including a handle for advancing said member along said slot formed in said cast, and further including a pair of jaws spaced apart to define a cutting aperture open at its leading end and closed at its trailing end, one of said jaws having an inclined surface extending from said leading end of said cutting aperture and terminating in a guide shoe adapted to extend through said slot, travel beneath said soft wrappings, guide said member longitudinally of said slot, and raise said soft wrappings along said inclined surface and outwardly of said slot during said advancing of said member;

a pair of resilient cutting blades having elongated razor-like cutting edges;

and means mounting said cutting blades in said cutting aperture of said member in confronting relation with the leading extremities of said cutting edges located adjacent said forward end of said cutting aperture for receiving said soft wrappings, and with the tips of the trailing extremities of said cutting edges arranged to intersect in predetermined relation ahead of and in spaced relation to said trailing end of said cutting aperture to define a relief space whereby the relatively minute portion of said soft wrappings uncut by said cutting edges can be forced past said resilient blades into said relief space for tearing apart by the portion of said member defining said trailing end of said cutting aperture.

2. A device according to claim 1 wherein said means include a cartridge rigidly mounting said cutting blades with said cutting edges in said predetermined intersecting relation, said cartridge being slidably received within a complemental opening provided in said member adjacent said inclined surface.

References Cited

UNITED STATES PATENTS

| 2,805,476 | 9/1957 | Bishaf | 30—317 |
| 3,028,670 | 4/1962 | Tilly | 30—294 |

FOREIGN PATENTS 603,942   6/1948   Great Britain.

JAMES L. JONES, JR., *Primary Examiner.*